United States Patent
Nagar et al.

(10) Patent No.: US 12,547,435 B2
(45) Date of Patent: Feb. 10, 2026

(54) PERSONALIZED MODIFICATION OF AUDIO AND VISUAL COMPONENTS OF A VIRTUAL AGENT OF A USER INTERFACE

(71) Applicant: INTERNATIONAL BUSINESS MACHINES CORPORATION, Armonk, NY (US)

(72) Inventors: Raghuveer Prasad Nagar, Kota (IN); Vivek Chintalapati, Hyderabad (IN); Hiti Sinha, Pune (IN); Sidharth Ullal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 17/750,638

(22) Filed: May 23, 2022

(65) Prior Publication Data

US 2023/0376328 A1    Nov. 23, 2023

(51) Int. Cl.
*G06F 9/451* (2018.01)
*G06F 16/2457* (2019.01)
(Continued)

(52) U.S. Cl.
CPC ........ *G06F 9/453* (2018.02); *G06F 16/24578* (2019.01); *G06F 16/248* (2019.01); *G10L 21/003* (2013.01)

(58) Field of Classification Search
CPC .. G06F 9/453; G06F 16/24578; G06F 16/248; G10L 21/003; G10L 13/033
See application file for complete search history.

(56) References Cited

U.S. PATENT DOCUMENTS

2016/0300570 A1    10/2016   Gustafson
2016/0361653 A1*   12/2016   Zhang ............... A63F 13/332
(Continued)

FOREIGN PATENT DOCUMENTS

CN    108711423 A     10/2018
WO    2016161432 A1   10/2016
WO    2021066399 A1    4/2021

OTHER PUBLICATIONS

"Introducing Star Wars RPG chatbot: become the hero of your interactive space adventure!", Medium, Dec. 15, 2016, 3 pages, <https://medium.com/@SAPCAI/introducing-star-wars-rpg-chatbot-become-the-hero-of-your-interactive-space-adventure-b33f135818be>.
(Continued)

*Primary Examiner* — Rami R Okasha
(74) *Attorney, Agent, or Firm* — Kelsey M. Skodje

(57) ABSTRACT

Systems, methods and/or computer program products personalizing user interactions with virtual agents of applications and/or services, using audio/visual components customized to appeal to user preferences. Upon initial interaction with virtual agents, AI ranking algorithms are triggered to adopt the highest ranked persona for the virtual agent based on previous positive interactions with the user, learned preferences, the user's state inferred from facial expressions, body language, tone. Personas can emulate voice signatures of popular characters, actors, celebrities and sports figures, and access a corpus of dialogue of the available personas to learn unique speech patterns, slang, tone, grammar, speed, and vocabulary. The corpus that comprises various personas of real and/or fictional individuals can include data of the mannerisms and visual likeness of the various characters and people, allowing avatars depicting the virtual agents to be animated in the likeness of
(Continued)

the selected persona in real-time during conversational workflows.

17 Claims, 8 Drawing Sheets

(51) Int. Cl.
*G06F 16/248* (2019.01)
*G10L 21/003* (2013.01)

(56) References Cited

U.S. PATENT DOCUMENTS

| | | | | |
|---|---|---|---|---|
| 2019/0102064 A1* | 4/2019 | Brown | .................... | H04L 51/02 |
| 2019/0143527 A1 | 5/2019 | Favis | | |
| 2019/0267006 A1* | 8/2019 | Tseretopoulos | ..... | G10L 15/1807 |
| 2021/0038990 A1* | 2/2021 | Jeong | .................... | A63F 13/533 |
| 2022/0200934 A1* | 6/2022 | Dutta | .................... | G06V 40/176 |
| 2023/0230303 A1* | 7/2023 | Yang | ........................ | G06N 3/02 |
| | | | | 345/419 |
| 2023/0343324 A1* | 10/2023 | Baeuml | .................... | G10L 25/57 |

OTHER PUBLICATIONS

"Talking Head", Chatbots.org, downloaded from the internet on Apr. 25, 2022, 12 pages, <https://www.chatbots.org/talking_head/>.
Angadala, Vamsee, "You Can Chat with Your Favorite Movie Characters Soon—Thanks to the AI-based Chatbots!", iGadgetsworld, Mar. 18, 2018, 7 pages, <https://www.igadgetsworld.com/ai-chatbot-chat-with-movie-character/>.
Ghoshal, Abhimanyu, "Imperson's new tech lets fans chat with their favorite fictional characters", The Next Web, Jun. 21, 2015, 5 pages, <https://thenextweb.com/news/impersons-new-tech-lets-fans-chat-with-their-favorite-fictional-characters>.
Hefny et al., "Towards a Generic Framework for Character-Based Chatbots", International Conference on Practical Applications of Agents and Multi-Agent Systems, Oct. 2020, pp. 95-107.
Jiang et al., "Personality-aware Chatbot: an Emerging Area in Conversational Agents", Transactions on Emerging Topics in Computational Intelligence, Nov. 2020, 20 pages.
Ma et al., "One Chatbot Per Person: Creating Personalized Chatbots based on Implicit User Profiles", arXiv:2108.09355v2 [cs.CL], Sep. 2, 2021, 10 pages.
Mell et al., "The NIST Definition of Cloud Computing", Recommendations of the National Institute of Standards and Technology, Special Publication 800-145, Sep. 2011, 7 pages.
Nguyen et al., "A Neural Chatbot with Personality", provided by the inventors on Aug. 31, 2021, 7 pages.
Rowe, Adam, "Texting Your Favorite Movie Character Is the Latest Franchise-Building Move", Forbes, Nov. 24, 2018, 4 pages, <https://www.forbes.com/sites/adamrowe1/2018/11/24/texting-your-favorite-movie-character-is-the-latest-franchise-building-move/?sh=32dc27464bb7>.
Shewan, Dan, "10 of the Most Innovative Chatbots on the Web", WordStream, Apr. 22, 2022, 33 pages, <https://www.wordstream.com/blog/ws/chatbots>.

* cited by examiner

PERSONALIZED MODIFICATION OF AUDIO AND VISUAL COMPONENTS OF A VIRTUAL AGENT OF A USER INTERFACE

BACKGROUND

The present disclosure relates generally to the field of artificial intelligence and user interfaces. More specifically, personalized custom interaction experiences integrated into user interfaces of applications or services using audio and visual components that increase engagement between users and workflows of the user interface.

Artificial intelligence (AI) is a field that combines computer science, and robust datasets to enable problem solving by machines and/or computer programs. AI can encompass the sub-fields of machine learning and deep learning, utilizing AI algorithms that seek to create expert systems which can make predictions or classifications based on the input data. Deep learning is a subset of machine learning and is comprised of neural networks. Neural networks comprise at least three layers, an input layer, output layer and one or more hidden layer. The way in which deep learning and machine learning differ is in how each algorithm learns. Deep learning automates much of the feature extraction portion of the process, eliminating some of the manual human intervention required and enabling the use of larger data sets. Classical, or "non-deep", machine learning is more dependent on human intervention to learn. Human experts determine the hierarchy of features to understand the differences between data inputs, usually requiring more structured data to learn. "Deep" machine learning can leverage labeled datasets, also known as supervised learning, to inform its algorithm, but it doesn't necessarily require a labeled dataset. It can ingest unstructured data in its raw form (e.g., text, images), and it can automatically determine the hierarchy of features which distinguish different categories of data from one another. Unlike traditional machine learning, deep learning doesn't require human intervention to process data, allowing developers to scale machine learning in different or unique ways. There is a plurality of real-world applications of AI systems. Existing examples can include speech recognition, customer service, computer vision, and recommendation engine.

SUMMARY

Embodiments of the present disclosure relate to a computer-implemented method, an associated computer system and computer program products for personalizing user interactions with virtual agents of a user interface using audio components and/or visual components. The computer-implemented method comprises: receiving an engagement with a virtual agent of the user interface by a user; triggering, in response to the engagement of the virtual agent, a selection of a persona for the virtual agent, wherein selection of the persona comprises: collecting real-time data of an application or service running the user interface and historical data about the user from one or more data sources and a corpus of available personas, wherein each of the available personas comprises the audio components or the visual components that modify a visual appearance or audio presentation of the virtual agent on the user interface; applying a ranking algorithm to the available personas, ranking the available personas, based on features that most closely align with preferences of the user, highest in the ranking; selecting the persona from the ranking of available personas that is ranked highest by the ranking algorithm for the user; modifying settings and behaviors of the virtual agent with one of more of the audio components or the visual components in accordance the persona selected by the ranking algorithm; and guiding the user through a workflow presented by the user interface via the virtual agent modified in accordance with the persona ranked highest by the ranking algorithm.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
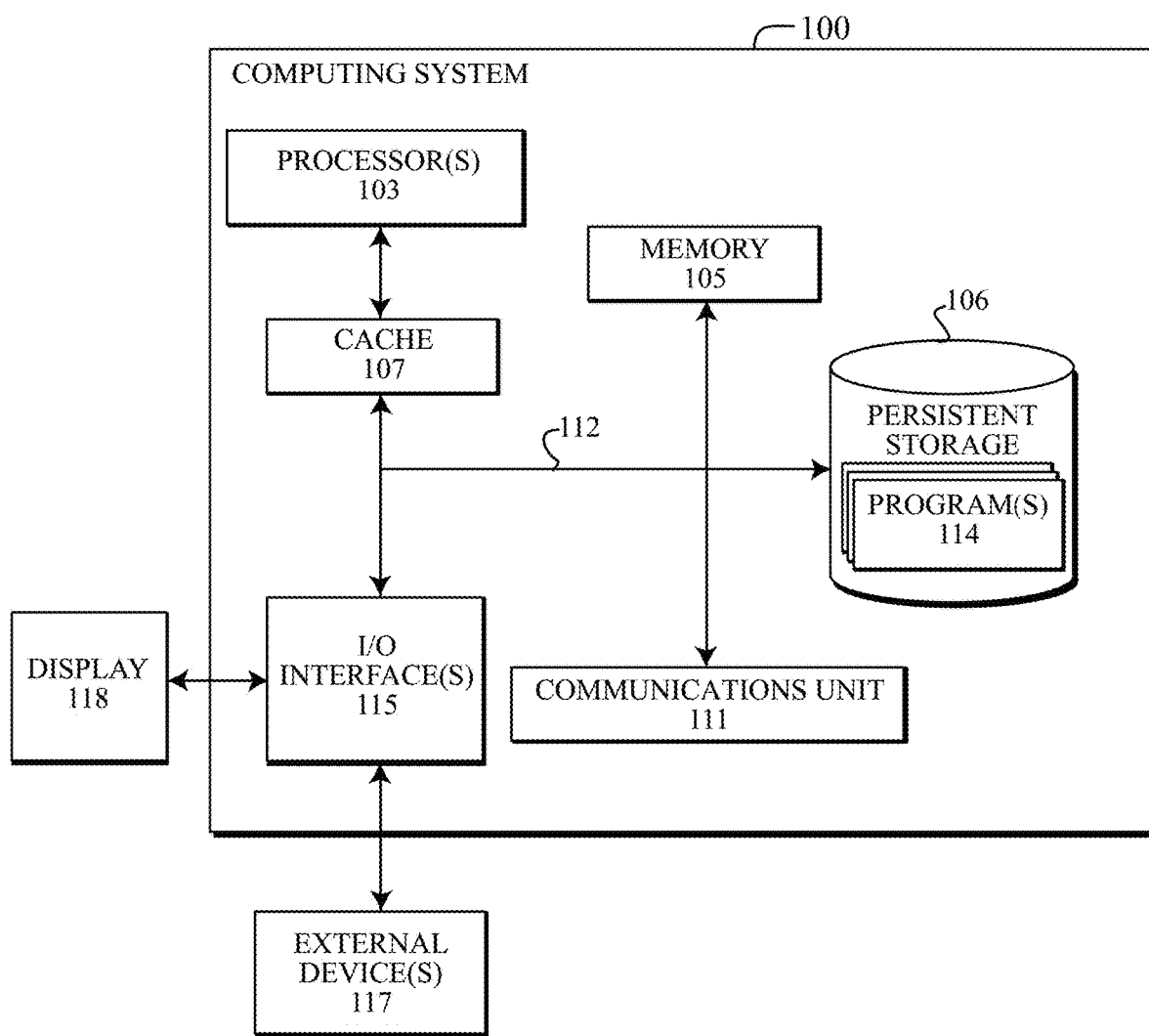
FIG. 1 depicts a block diagram illustrating an embodiment of a computing system and the internal and external components thereof, upon which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Users often encounter issues while using software solutions such as a web service or applications. In some situations, user assistance can be in the form of an actual customer care professional who can directly respond to the needs of user via a human-to-human interaction. Recently however, software support and user assistance are becoming increasingly more common to be provided by virtual assistants, chatbots and other AI-directed agents (referred to herein generally as "virtual agents") operating as part of the user interface. These AI-directed interfaces can be known for being frustrating to users or offer lackluster experience. So much so, that users may often look for any other possible available solutions to their issues before engaging the available virtual AI agents. Embodiments of the present disclosure recognize that users who engage with virtual AI agents offering assistance that is not meeting a user's expectations are likely to abruptly exit a web service or application prematurely and end the session instead of completing an intended transaction or function. Premature termination of service, support or transactions can be due to monotonous, uninteresting and/or counter-intuitive responses being provided by the virtual agents. Loss of users due to frustration or boredom can translate to lower user retention, lost revenues and an overall reduction in user engagement with the services or applications. Therefore, there is a long felt need for a personalized interaction experience with AI-directed virtual agents or assistants that offer an engaging experience to users, that keeps the customer engaged with the interactions, improves user retention and/or increases a completion rate of the users' intended transactions, reducing and/or avoiding occurrences of premature termination of sessions with the virtual agent.

Embodiments of the present disclosure leverage the use of AI and/or networks of internet-of-things (IoT) devices to create a system, method and/or computer program products that improve the virtual agent experience, offering an engaging and/or interesting personalized user experience. Embodiments of the personalized experience can integrate the use of audio and/or visual components to customize the interaction with virtual agents, based on user preferences for the content, conversation and/or experience during the interaction, keeping the user engage and entertained, improving user retention and interest in the interactions with the virtual agents, preventing pre-mature termination of the interaction by the user. Embodiments of the personalized user experience can be implemented using AI learning techniques which may process multiple sources of data about users, learn insights and preferences of the user and improve the personalization of the interactions with the virtual agents. For example, embodiments of the disclosed system may have access to multiple sources of historical data, which can include personal tastes about content, including liked and disliked content, personality traits and information about the user shared with the system, including social media posts, online profile(s), past interactions and/or purchase histories. Users may also share real-time data collected about themselves via IoT devices, including high-quality audio data, video data, location data, sensor data or any other type of data available for collection by IoT devices.

When a user begins an interaction with the virtual agent of a user interface, embodiments of the present disclosure may use one or more AI learning techniques such as a ranking algorithm to adopt identify and select the best persona to apply to the virtual agent interacting with the user. Embodiments of the ranking algorithm may consider past interactions with the user while conversing using one or more personas, the learned preferences of the user for particular types of content, including likes and dislikes of the user, and/or the inferred mental or emotional state of the user as evidenced by facial expressions, body language, tone, and other audio or visual indicators. The available personas can be ranked by various characteristics, including visual features and tonal characteristics. Based on known information about the user, the highest ranked persona with the visual avatar, tonal characteristics and/or other appealing features that are most likely to appeal to the user, can be selected for implementation by the virtual agent interacting with the user. For example, personas may use historical data sources to emulate voice signatures of popular characters, actors, celebrities and sports figures as well as access a corpus of dialogue of the available personas to learn and mine unique speech patterns such as slang, tone, grammar, speed, vocabulary and/or use of adjectives. Moreover, the corpus that comprises various personas of real and/or fictional individuals can include data of the mannerisms and visual likeness of the various characters and people, allowing avatars depicting the virtual agents to be animated in the likeness of the selected persona in real-time during conversational workflows.

Embodiments of the virtual agent may use the selected persona and proceed to guide the user through the workflows of the user interface using various inputs and/or outputs. While guiding the user through the workflows, embodiments of the disclosure can be aware of the context within the workflows being presented to the user. For example, contextual factors taken into consideration by the virtual agent can include the criticality of certain workflow steps, delays in the backend processing of user input as well as changes to the user's mental or emotional state over time. Based on the additional contextual factors, the system can rank potential behavioral changes that can be applied to the virtual agent's persona in order to continue to appeal to the user over time as the interaction continues. Along with identifying modifications to the behavior of the virtual agent, embodiments of the disclosure can further consider the history of conversations and/or past interactions with the same user over time to factor into decisions whether to use a repeated conversation topic, behavior, or action during a subsequent interaction with the same user. Ensuring that, unless the user previously responded very positively to the topics, behaviors, actions, etc., of previous interactions, the virtual agent is not repeating a conversational workflow with the user or repeating the conversational flow too often. The virtual agent can engage in conversational workflows with the user using the selected persona as modified by the behavioral change or action to answer questions, and keep the user engage by using content such as text, video, audio, and images. In some embodiments, historical interactions with other users with similar likes and preferences can be considered as well. During conversational workflows, virtual agents may modify behaviors and present content to a current user in a manner that was previously successful to engage other users having similar preferences.

In some embodiments, modifications to the behavior of the virtual agent's actions can be further augmented or performed along with consideration of real-time (or near real-time) events that may be occurring in the world that may be of interest to the user engaging within the virtual agent. A "real-time" event may be an ongoing event that is currently occurring, while a "near real-time" event may be an event that was previously ongoing but has recently concluded or ended. A data source comprising ongoing or recently concluding events can be scanned, compiled and ranked in correlation with the user's preferences and profile. If any of the events correlate strongly enough to the user interacting with the virtual agent, then embodiments of the present disclosure can integrate the context of the real-time or near real-time events into conversational workflows with the user.

Embodiments of the present disclosure may constantly receive direct and indirect feedback from the user or about the user as conversational workflows progress. With each iterative cycle of an interaction with a user, as the user interacts with the virtual agent of the disclosed system, method or program products, feedback (whether positive or negative) can influence subsequent decisions, conversation topics, integration of real-time events, actions, modifications to behaviors, the selected persona, audio or visual components being integrated into the conversation and/or other content being presented to the user via the interface.

Computing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram describing an embodiment of a computing system 100, which may be a simplified example of a computing device (i.e., a physical bare metal system and/or a virtual system) capable of performing the computing operations described herein. Computing system 100 may be representative of the one or more computing systems or devices implemented in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, virtualized computer systems, container-oriented architecture, microservice-oriented architecture, etc. For example, computing system 100 can take the form of a desktop computer system or workstation, laptops, notebooks, tablets, servers, client devices, network devices, network terminals, thin clients, thick clients, kiosks, mobile communication devices (e.g., smartphones), multiprocessor systems, microprocessor-based systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, application(s), processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 or application(s) can be loaded into persistent storage 106.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

Figure 2:
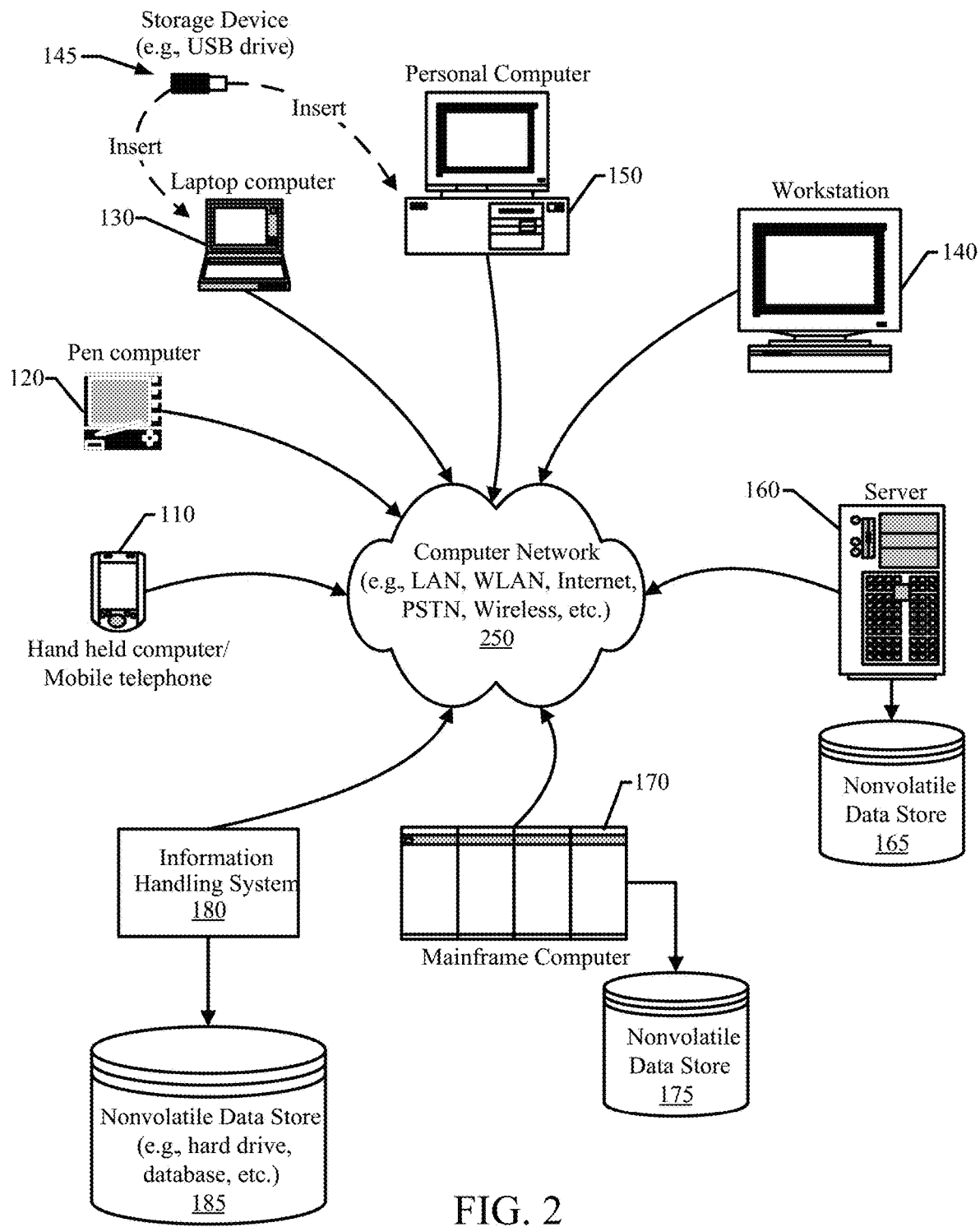
FIG. 2 depicts a block diagram illustrating an extension of the computing system environment of FIG. 1, wherein the computing systems are configured to operate in a network environment and perform methods described herein in accordance with the present disclosure.

FIG. 2 provides an extension of the computing system 100 environment shown in FIG. 1 to illustrate that the methods described herein can be performed on a wide variety of computing systems that operate in a networked environment. Types of computing systems 100 may range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet computer 120, laptop or notebook computer 130, workstation 140, personal computer system 150, and server 160. Other types of information handling systems that are not individually shown in FIG. 2 are represented by information handling system 180.

Many of the computing systems can include nonvolatile data stores, such as hard drives and/or nonvolatile memory. The embodiment of the information handling system shown in FIG. 2 includes separate nonvolatile data stores (more specifically, server 160 utilizes nonvolatile data store 165, mainframe computer 170 utilizes nonvolatile data store 175, and information handling system 180 utilizes nonvolatile data store 185). The nonvolatile data store can be a component that is external to the various computing systems or can be internal to one of the computing systems. In addition, removable nonvolatile storage device 145 can be shared among two or more computing systems using various techniques, such as connecting the removable nonvolatile storage device 145 to a USB port or other connector of the computing systems. In some embodiments, the network of computing systems 100 may utilize clustered computing and components acting as a single pool of seamless resources when accessed through network 250 by one or more computing systems. For example, such embodiments can be used in a datacenter, cloud computing network, storage area network (SAN), and network-attached storage (NAS) applications.

As shown, the various computing systems 100 can be networked together using computer network 250 (referred to herein as "network 250"). Types of networks 250 that can be used to interconnect the various information handling systems include Local Area Networks (LANs), Wireless Local Area Networks (WLANs), home area network (HAN), wide area network (WAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 100.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
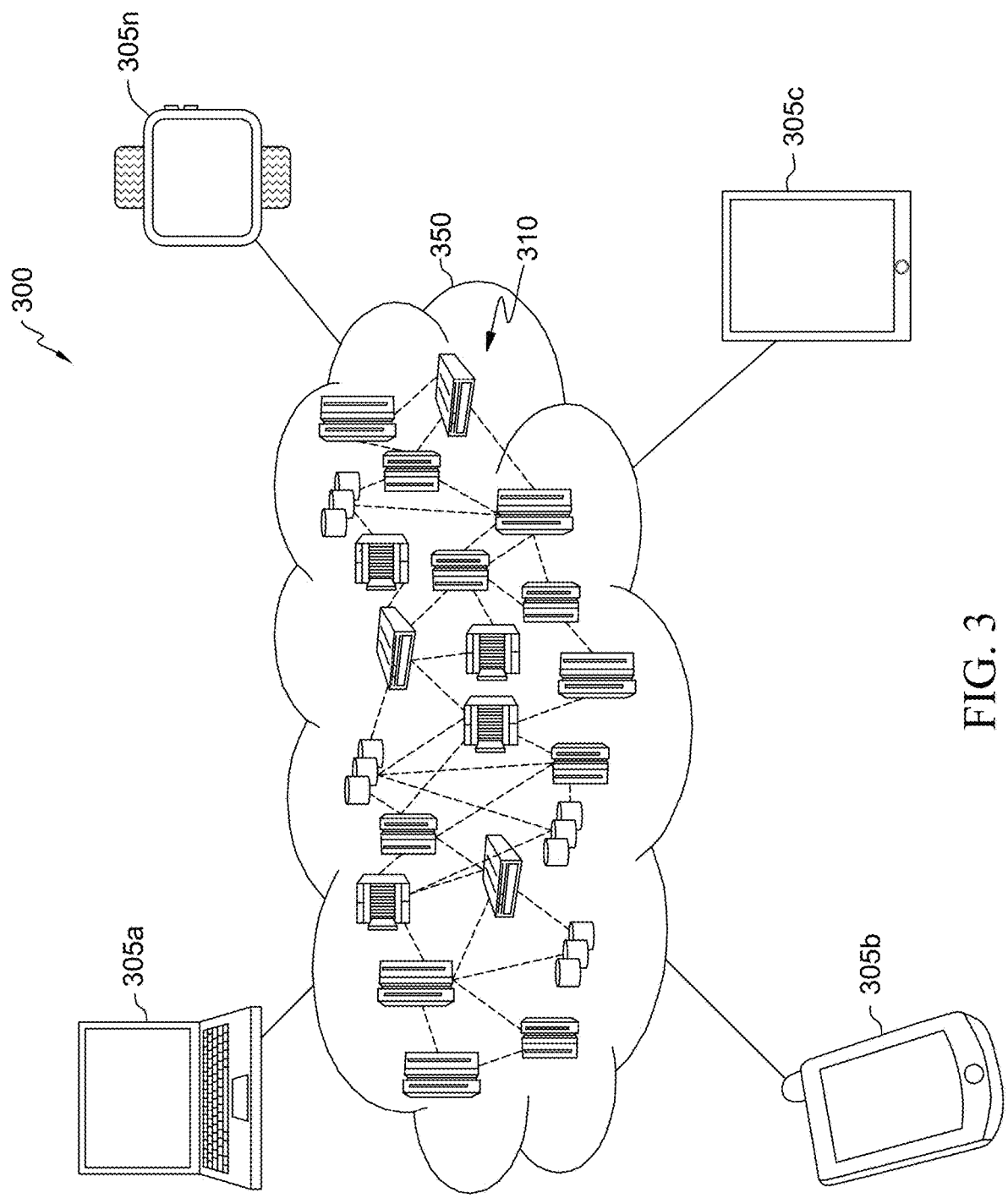
FIG. 3 depicts a block diagram illustrating a cloud computing environment in accordance with the present disclosure.

Referring to the drawings, FIG. 3 is an illustrative example of a cloud computing environment 300. As shown, cloud computing environment 300 includes a cloud network 350 comprising one or more cloud computing nodes 310 with which end user device(s) 305a-305n (referred to generally herein as end user device(s) 305) or client devices, may be used by cloud consumers to access one or more software products, services, applications, and/or workloads provided by cloud service providers or tenants of the cloud network 350. Examples of the user device(s) 305 are depicted and may include devices such as a desktop computer, laptop computer 305a, smartphone 305b or cellular telephone, tablet computers 305c and smart devices such as a smartwatch 305n, smart glasses, sensors, or other IoT devices. Nodes 310 may communicate with one another and may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of end user devices 305 shown in FIG. 3 are intended to be illustrative only and that computing nodes 310 of cloud computing environment 300 can communicate with any type of computerized device over any type of network and/or network addressable connection (e.g., using a web browser).

Figure 4:
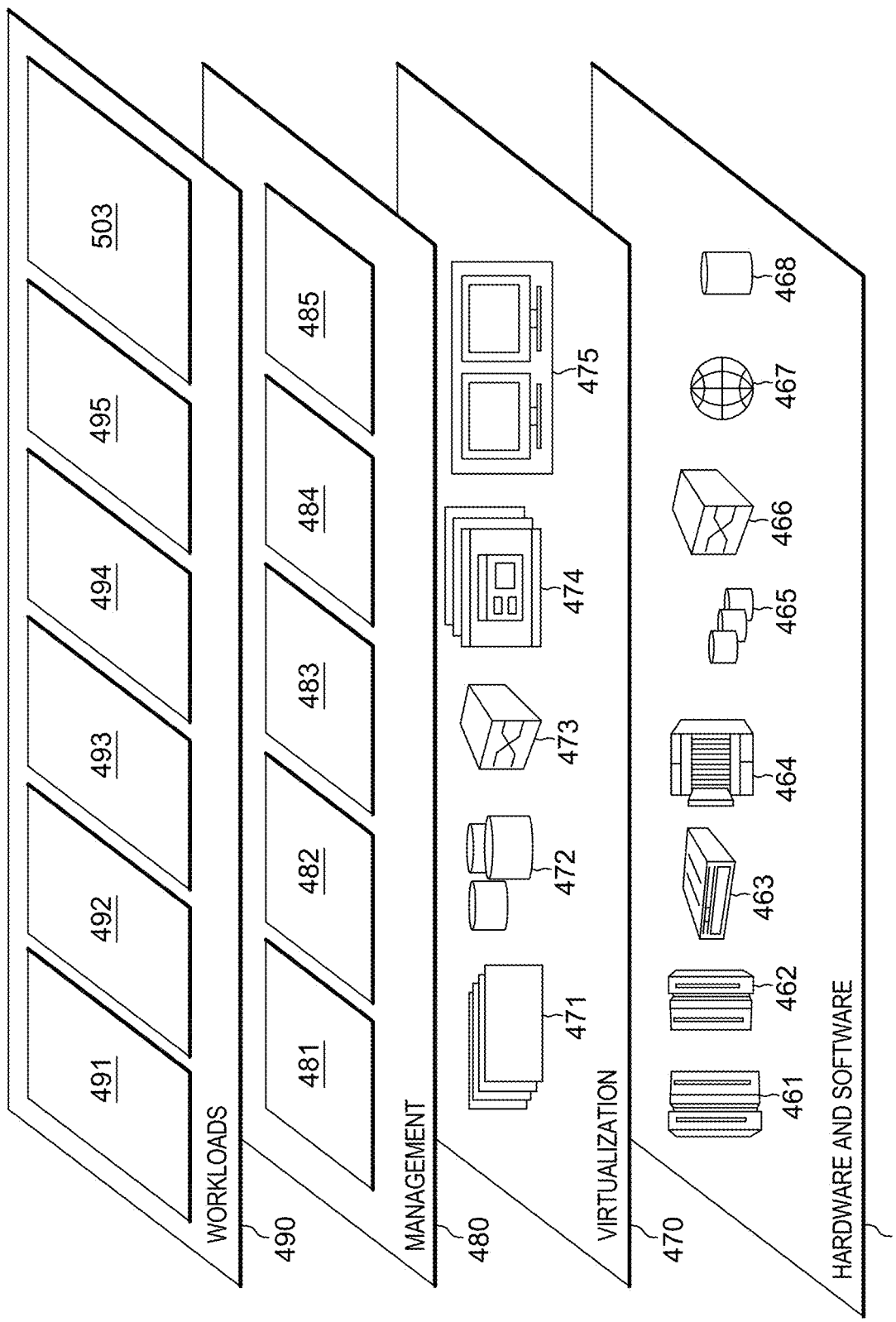
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

Management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include software development and video streaming services 491, data analytics processing 492, multi-cloud management 493, transaction processing 494; video conferencing 495 and personalized interaction module 503.

System for Personalizing User Interactions with Virtual Agents of a User Interface It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 5:
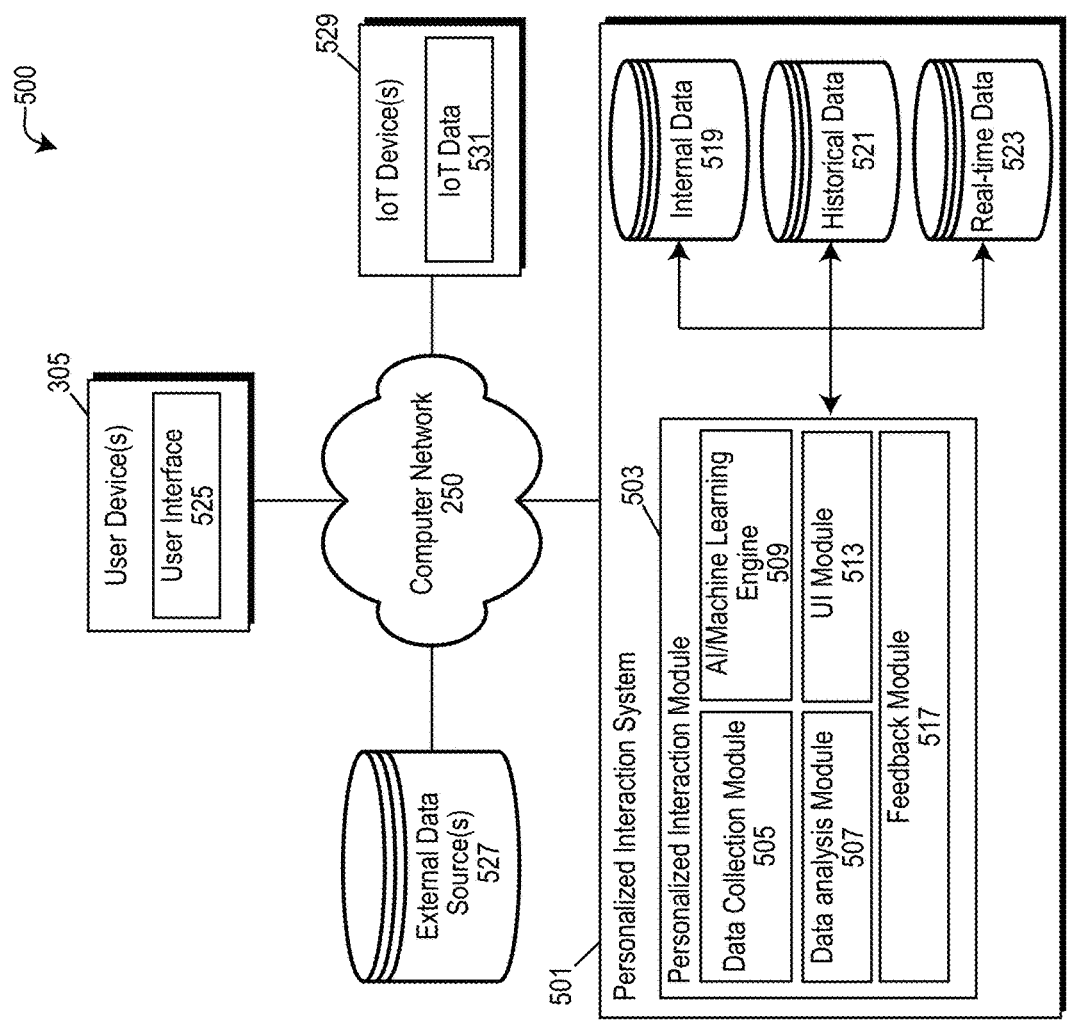
FIG. 5 depicts a functional block diagram describing an embodiment of a computing environment for personalizing user interactions with a virtual agent of a user interface, in accordance with the present disclosure.
Figure 6:
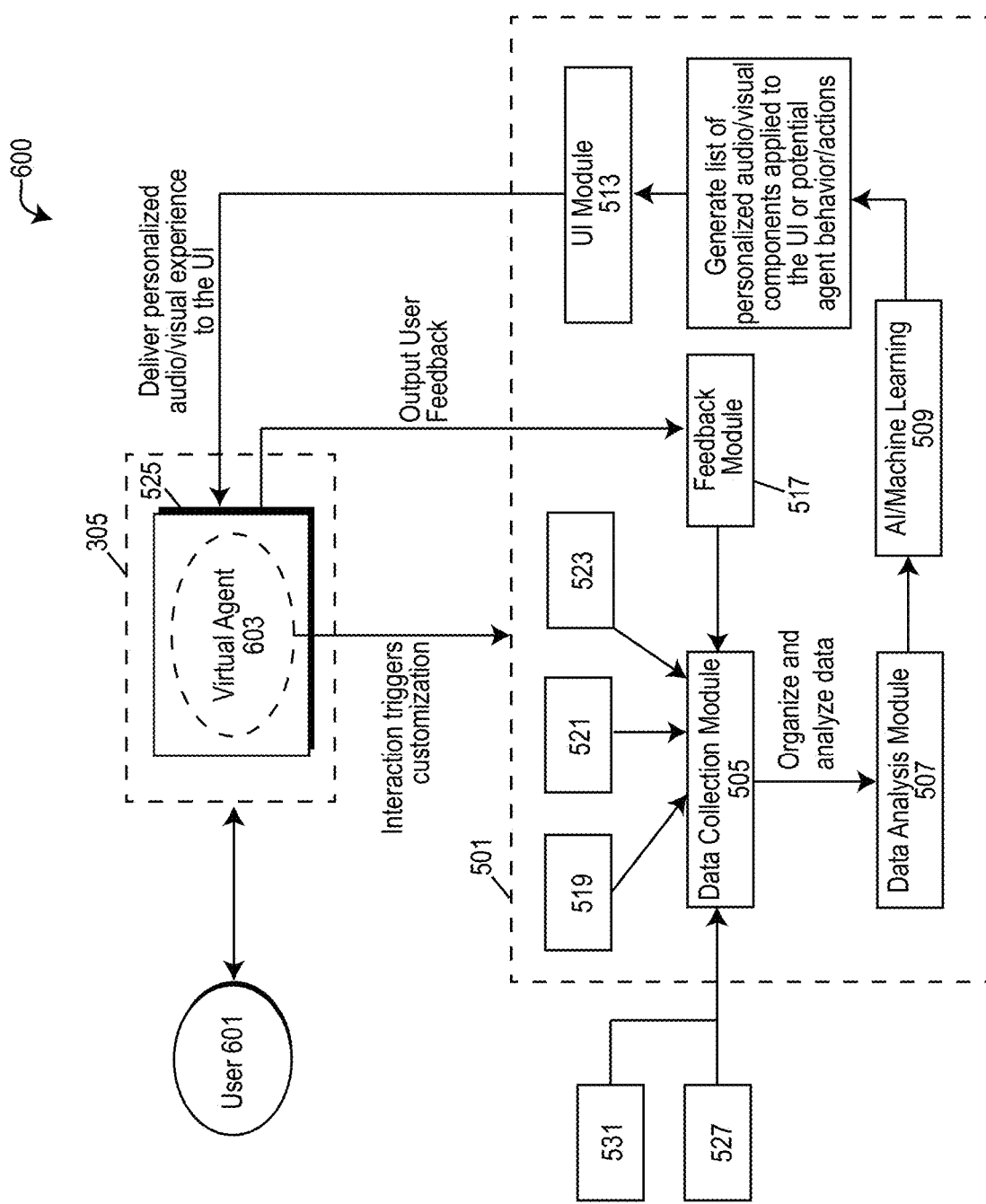
FIG. 6 depicts a block diagram describing an embodiment of a workflow for personalizing user interactions with a virtual agent of a user interface in accordance with the present disclosure.

Referring to the drawings, FIGS. 5-6 depict approaches to personalizing user interactions with virtual agents 603 of a user interface 525, that can be executed using one or more computer systems 100 operating within a computing environment 500, 600 and variations thereof. The approaches described herein implement systems, methods and computer program products to personalize user interface 525 interactions between a user 601 operating a user device 305 and a virtual agent 603 using artificial intelligence and/or machine learning to communicate with the user 601 via the user interface 525. Embodiments of computing environments 500, 600 may include one or more computer systems 100 interconnected via a computer network 250. The computer systems 100 connected to the computer network 250 may be specialized systems or devices that may include, but are not limited to, the interconnection of personalized interaction system 501 as shown in FIGS. 5-6 (and variations thereof), IoT device(s) 529, user device(s) 305 and/or one or more data sources, including but not limited to, internal data 519, historical data 521, real-time data 523, IoT data 531 and external data source(s) 527.

The computing systems 100 exemplified in FIGS. 5-6 may not only comprise the elements of the systems and devices depicted in the drawings of FIGS. 5-6 but may further incorporate one or more elements of a computing system 100 shown in FIG. 1 and described above. Although not shown in the drawings, one or more elements of the computing system 100 may be integrated into the embodiments personalized interaction system 501, IoT device(s) 529, user device(s) 305 and computing systems maintaining data sources 519, 521, 523, 527, 531. For example, elements of computing system integrated into the systems depicted in FIG. 5-6 may include (but are not limited to) the integration of one or more processor(s) 103, program(s) 114, memory 105, persistent storage 106, cache 107, communications unit 111, input/output (I/O) interface(s) 115, external device(s) 117 and human-readable display 118.

As shown in the exemplary embodiment of computing environment 500, the computing environment 500 may include one or more systems, components, and devices connected to the network 250, including one or more user devices 305, IoT devices 529, data sources 527 and a personalized interaction system 501 for customizing virtual agents operating as part of an application or services accessible to the user device 305 through a user interface 525. As part of the computing environments 500, 600, personalized interaction system 501 may perform functions, processes and tasked associated with selecting and applying one or more personas to virtual agents 603 of the user interface 525, predictively modify behaviors and/or actions of the virtual agents 603 during interactions with the user, integrate real-time events into conversational workflows and provide content such as audio, video, text and/or images into the conversational workflows, improving engagement with users and prevent premature termination of a virtual agent session by the user 601.

Embodiments of personalized interaction system 501 may comprise one or more components or modules that may be tasked with implementing specific functions, tasks or processes associated with personalizing or customizing the interactions between user 601 and virtual agent 603 of an application, program or service being accessed by a user device 305. In the example provided by FIG. 5, the personalization and customization of applications and/or services may be provided by a personalized interaction module 503.

The term "module" may refer to a hardware module, software module, or a module may be a combination of hardware and software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one or more computing systems 100 operating as part of the computing environment 500. For example, the personalized interaction module 503 can be a program, service and/or application loaded into the memory 105, persistent storage 106 or cache 107 of a host system, such as the personalized interaction system 501. Embodiments of the personalized interaction module 503 may comprise a plurality of components and/or sub modules assigned to carry out specific tasks, or functions of the personalized interaction module 503. As shown in the exemplary embodiment of the personalized interaction module of FIG. 5, the personalized interaction module 503 may comprise components such as a data collection module 505, data analysis module 507, AI/machine learning engine 509, UI module 513 and feedback module 517.

Embodiments of data collection module 505 may perform the functions, tasks or processes of the personalized interaction module 503 associated with accessing, retrieving and/or mining data from a plurality of data sources 519, 521, 523, 527, 531. The data sources 519, 521, 523, 527, 531 may include databases, data warehouses and/or other types of data repositories comprising publicly available information, or privately available information wherein the personalized interaction system 501 has been granted access either by the user 601, owner or administrator to access the private data source. In some instances, access to one or more data sources may be subscription-based and data collection module 505 may be permitted access on a user-by-user basis. For example, in exchange for a fee or other consideration, the data collection module 505 may access the subscription-based data sources that may include additional or supplemental user information, customization options and/or configurations for a plurality of available personas.

In the exemplary embodiment of the computing environment 500, the data collection module 505 is shown to have access to a plurality of data sources 519, 521, 523, 527, 531. For example, the databases and/or repositories containing the data can include internal data 519, historical data 521, real-time data 523, IoT data 531 and one or more external data sources 527. Internal data 519 may comprise user-specific data or profiles created by the personalized interaction system 501. For instance, internal data 519 may include user-specific profiles, settings, preferences for each user 601 that interacts with an application or service interface that is customized by the personalized interaction system 501. External data source(s) 527 may include user profiles, configurations, settings or preferences from data sources that may be available outside of the personalized interaction system 501. For instance, a user 601 may grant the personalized interaction system 501 access to one or more social media profiles or online shopping platforms accessed by the user 601 as well as a history of user interactions on social media network or other websites which may include an archive of likes and dislikes, personality traits, customer data, purchase histories, product or service reviews, etc.

Personalized interaction system 501 may have access to multiple data sources containing historical data 521. Embodiments of historical data 521 can include one or more corpuses comprising audio and/or visual components of one or more available personas that may be adopted and applied to the virtual agent 603. For example, historical data 521 can include one or more corpuses comprising voice signatures and/or waveform data sampling audio of popular characters, actors, celebrities, sports figures and other people (real or fictitious) that can be applied to a persona, learned or mimicked by the virtual agent 603, as part of the persona. In some embodiments, the corpuses comprising historical data 521 can include other audio components such as samples of dialogue that can be used to extract unique speech patterns associated with the characters or people (and composites thereof). The dialog can be used to teach and configure the virtual agent 603 to mimic aspects of the selected person's speech and voice, including various types of slang, tone, grammar, speed, vocabulary and use of adjectives. In some embodiments, historical data 521 may further comprise video components, including visual reference materials of the characters or persons upon which the personas applied to the virtual agent 603 can be animated in the likeness thereof. For example, visual references materials of a person or character (either real or fictitious) may be provided to animate a visual avatar in real time in a manner that reflects the mannerisms and likeness of the person or character being used as the persona applied to the virtual agent 603.

In addition to corpuses comprising audio and/or visual components for modeling the personalities and mannerisms of various personas, historical data 521 may also comprise a historical reference (made available with permission of the user 601) describing the past interactions between the user 601 and virtual agent(s) 603 of a user interface 525. The historical data 521 describing the user's past interactions may be across a plurality of different applications or services that may use the interactive customization services provided by personalized interaction system 501 and/or the personalized interaction module 503. The historical data 521 about the user can include topics, interactions, features, categories, etc. known to be liked or disliked by the user, as well as personality traits, preferences and/or insights derived from user responses including engagement lengths, purchasing behaviors, transactional behaviors, etc. when interacting with various actions or behaviors presented by a virtual agent 603. Such historical interaction histories provided by the historical data 521, can allow the personalized interaction module 503 to better predict which future personas, behaviors, actions, etc., selected by the personalized interaction module 503 will most successfully maintain engagement with the user 601.

Embodiments of the real-time data 523 collected or retrieved by the data collection module 505 may include information real-time information about the application or service being accessed by the user 601 and context thereof as the user 601 interacts with and manipulates the user interface 525, as well as real-time audio and/or visual data permitted to be collected about the users 601. For example, information and data describing a current application or service being accessed by the user 601 can include state information about the workflow during a current interaction with the user 601. For instance, if the application or service being accessed by the user 601 as the user 601 interacts with the virtual agent 603 is a storefront for making a purchase, the state information describing the workflow could include information such as order creation, product searches, shopping cart information, other transactional information, etc. Additional data describing the workflow of an application or service being accessed by a user 601 during user's interaction with a virtual agent 603 may also be stored by the real time data 523. For example, data from within the workflow such as the time left to process a request, context of the workflow including whether a user is trying to submit a transaction, cancel a transaction, or amend a transaction. Additional downstream process data that can be stored and made accessible to the data collection module 505 as real-time data 523 can include the amount inventory remaining, weather events, delays, etc.

In some embodiments of the personalized interaction system 501, real-time, high quality audio data, video data, as well as sensor data, location data, etc., may be collected and stored as real-time data 523. For example, the data collection module 505 may retrieve audio, visual, sensor, location and other data about the user (with user permissions) from one or more IoT devices 529 as IoT data 531. An IoT device 529 may be any piece of hardware such as sensors, gadgets, appliances and other machines with an addressable connection that can exchange information and data over a network connection (such as the Internet). The IoT device 529 can collect and store data as IoT data 531 which may be transferred via the computer network 250 to the data collection module 505 directly or stored by the personalized interaction system 501 as real-time data 523 and may be subsequently retrieved from real-time data 523 storage by the data collection module 505. For instance, the IoT device 529 may be hardware integrated into the user device 305, such as a camera system, audio recording device, GPS location module, or sensor system. In other situations, the IoT devices 529 collecting data about the user 601 may be positioned around the user's surrounding environment and transmitting data describing the user to the personalized interaction system 501. In some embodiments, IoT data 531 collected by the IoT device(s) 529 can describe or log user activity or actions while using IoT device 529 or may provide data describing a user's interaction in real-time with the virtual agent 603. For example, user 601 body language, facial expressions, tone or sentiment, or other characteristics of the user that can be collected in real-time and/or may provide clues or insights about the user 601, and/or the user's mental or emotional state. Real-time data collection can help the personalized interaction module 503 (and more specifically AI/machine learning engine 509) infer various contextual clues from data collected by the IoT device 529, whether or not the user 601 has a positive or negative experience or engagement with the virtual agent 603 in real-time as the interaction occurs or is ongoing.

Embodiments of the personalized interaction module 503 may include a data analysis module 507. The data analysis module 507 may perform functions, processes or tasks of the personalized interaction module 503 which may be directed toward organizing, analyzing, pre-processing and/or formatting data for input into the AI/machine learning engine 509. Real world data collected in a raw form by the data collection module 505 from a plurality of different or diversified data sources using data mining techniques, may be "dirty", corrupted with inconsistencies, filled with noise, incomplete information and/or missing values. Embodiments of the data analysis module 507 can pre-process the data collected by the data collection module 505 and may convert the collected data into a preprocessed form that is ready for input into the AI/machine learning engine 509. Data analysis module 507 can transform or encode the data into a form or format that is more easily parsed, allowing for data features, objects and attributes to be more easily interpreted by the algorithms of the AI/machine learning engine 509. For example, data analysis module 507 can perform data cleaning in order to fill in missing values, smooth noisy data, resolve inconsistencies and/or remove outliers in the data. Moreover, the data analysis module may perform data integration, which may merge the multiple data sources into a single, larger data store.

Furthermore, data transformation applied by the data analysis module 507 may consolidate the quality data following data cleaning into an alternate form by changing the value, structure or format of the data using one or more data transformation strategies, including but not limited to data normalization, generalization, attribute selection and/or aggregation. Normalization may refer to a technique that may scale attributes of the collected data up or down to fit within a specified range. Using the normalization approach, the data analysis module 507 can constrain data attributes of the collected data to a particular container and develop a correlation among different data points. Normalization can be performed using min-max normalization, z-score normalization or decimal scale normalization. Generalization techniques may be used to convert low-level or granular data collected by the data collection module 505 into high-level information using hierarchies. For example, address or location information collected from the user might be generalized to obtain higher-level information such as a country associated with the user 601. Attribute selection techniques may be able to define new properties of data from existing attributes obtained by the data mining performed by the data collection module 505. For example, a date of birth attribute can be transformed into another property such as a generational identifier (such as Generation X, millennial, Gen-Z, etc.) which may influence the type of personas that may be ranked higher and/or available to modify a virtual agent 603. Moreover, aggregation pre-processing techniques may be a method applied to the collected data resulting in data being transformed into a summarized format.

In some embodiments of the data analysis module 507, the data reduction techniques may also be applied by the data analysis module 507. Data reduction may refer to techniques that may be applied when the size of a dataset being stored by a data warehouse or other data structure is too large to be analyzed or process by data mining algorithms. Data reduction can obtain a reduced representation of the dataset that is smaller in volume, while still producing an equivalent quality of analytical results. Examples of data reduction techniques can include data cube aggregation, dimensionality reduction, data compression, discretization, numerosity reduction, and/or attribute subset selection.

Embodiments of the AI/machine learning engine 509, may perform the tasks, processes and functions of the personalized interaction module 503 associated with modeling the data collected by data collection module 505, which has been pre-processed, analyzed, organized, and/or formatted by the data analysis module 507. Using the modeled data, AI/machine learning engine 509 can identify, rank and select a best persona to apply to a virtual agent 603 (including the selection of one or more audio and/or visual components) during interactions with specific users based on the data collected about the user, rank potential changes to behaviors or actions of the virtual agent 603 in response to user interactions, and/or the rank and integrate real-time event data into the behaviors or actions of the virtual agent 603 in response to user engagement. AI/machine learning engine 509 analyzes collected data sets inputted by data analysis module 507 and can predict, with a particular level of confidence, the best persona and response to customer interactions by the virtual agent 603 using audio/visual components, as well as real-time event data, based on user preferences, insights, past interactions, learned likes or dislikes of the customer and/or inferred mental or emotional state from the facial expressions, body language, tone, etc. of the user 601 to draw conclusions about which types of interactions and personas will maintain user engagement with the virtual agent 603.

Embodiments of the AI/machine learning engine 509 may use cognitive computing and/or machine learning techniques to identify patterns in data collected by the data collection module 505 and may have been pre-processed and inputted into the AI/machine learning engine 509 by the data analysis module 507. The AI/machine learning engine 509 may identify and select personas, modify or refine the behaviors or actions of virtual agents 603 over the course of conversation with the user and/or integrate real-time events into interactions with the user with minimal intervention by a human user or administrator of the personalized interaction system. Embodiments of the AI/machine learning engine 509 may use training methods such as supervised learning, unsupervised learning and/or semi-supervised learning techniques. Moreover, in some embodiments, the AI/machine learning engine 509 may also incorporate techniques of data mining, deep learning models, neural networking and data clustering to supplement and/or replace the machine learning techniques to rank and predict the best personas, modifications to the personas using audio/video components, and/or modifications and refinements to the actions and behaviors of the virtual agent 603 as the user 601 responds to the workflows presented by the user interface 525.

Supervised learning is a type of machine learning that may use one or more computer algorithms to train the AI/machine learning engine 509 using labelled examples during a training phase. The term "labelled example" may refer to the fact that during the training phase, there are desired inputs that will produce a known desired output by the AI/machine learning engine 509. For example, considering past positive interactions with users using various personas, learned likes and dislikes of a user and an inferred mental-emotional state based on facial expressions, body language and/or tone of users, in order to teach the AI/machine learning engine 509 to be able to correctly identify the best persona to apply to a virtual agent 603 using a ranking algorithm, when a user initiates an interaction with the user interface 525. The algorithm(s) of the AI/machine learning engine 509 may be trained by receiving a set of inputs along with the corresponding correct outputs. To employ supervised learning, the AI/machine learning engine 509 may store a labelled dataset for learning, a dataset for testing and a final dataset from which the AI/machine learning engine 509 may use for identifying and selecting the best personas to apply to the virtual agents 603 at the outset of an interaction initiated by a user, as well as potential changes to the behaviors or actions of the virtual agent 603, as the user 601 continues to converse and interact with the virtual agent 603.

During the training phase, the AI/machine learning engine 509 may learn the correct outputs by analyzing and describing well known data and information, that may be stored by the personalized interaction system 501, as well as one or more external data sources 527 and/or IoT devices 529. For example, collected datasets from data feeds of IoT devices 529 and/or historical data sets from historical data sources, which may be stored as part of the internal data 519, historical data 521, real-time data 523 or as part of a network-accessible data repository. The algorithm(s) of the AI/machine learning engine 509 may learn by comparing the actual output with the correct outputs in order to find errors. The AI/machine learning engine 509 may modify the machine learning models of data according to the correct outputs to refine decision making, improving the accuracy of the automated decision making of the AI/machine learning engine 509 to provide the correct inputs. Examples of data modeling may include classification, regression, prediction and gradient boosting.

Unsupervised learning techniques may also be used by the AI/machine learning engine 509 when there may be a lack of labelled internal data 519, historical data 521, real-time data, IoT data 531 and/or data from one or more external data sources 527, that may be available to teach the AI/machine learning engine 509 using labelled examples indicating user preferences and insights for a persona of a virtual agent 603 and/or actions and behaviors that keep the user engaged with the virtual agent 603. Machine learning that is unsupervised may not be "told" the right answer the way supervised learning algorithms do. Instead, during unsupervised learning, the algorithm may explore the datasets collected by the data collection module 505 which have been processed by the data analysis module 507 to find the patterns and commonalities among the datasets being explored. Examples of unsupervised machine learning may include self-organizing maps, nearest-neighbor mapping, k-means clustering, and singular value decomposition.

Embodiments of AI/machine learning engine 509 may also incorporate semi-supervised learning techniques in some situations. Semi-supervised learning may be used for the same applications as supervised learning. However, instead of using entirely labelled training examples of data during the training phase, there may be a mix of labelled and unlabeled examples during the training phase. For example, there may be a small or limited amount of labelled data being used as examples (i.e., a limited number of labelled internal data 519, historical data 521, real-time data 523, IoT data 531 and/or labelled data from external data sources 527) alongside a larger amount of unlabeled data that may be presented to AI/machine learning engine 509 during the training phase. Suitable types of machine learning techniques that may use semi-supervised learning may include classification, regression and prediction models.

In the exemplary embodiment of the AI/machine learning engine 509, when a user begins an interaction with a virtual agent 603 of the user interface 525, the AI/machine learning engine 509 of the personalized interaction system 501 can be triggered to determine the best persona to adopt for the interaction using one or more ranking algorithms. In the exemplary embodiment, the AI/machine learning engine 509 may be trained to rank available personas from a corpus of personas that may be applied to a virtual agent 603 using a machine learning algorithm for regression and classification in order to identify the persona that includes visual and tonal characteristics that will most likely appeal to the user based on user preferences and insights obtained from the datasets gathered by the data collection module 505. The ranking algorithm may consider as part of ranking the available personas past positive interaction between a virtual agent 603 and the user 601 engaging with the user interface 525; topics, features, attributes, etc. that are known from the collected datasets to be liked or disliked by the customer; and the inferred mental-emotional state of the user 601 through the collection of real-time data obtained by one or more IoT device 529, including facial expressions, body language, and tone of the user. The persona having the features and attributes that cause the persona to be scored the highest by the ranking algorithm will be selected and applied to the virtual agent 603 by the UI module 513 (described in further detail below). Application of the persona to the virtual agent can include the modification of the virtual agent 603 to incorporate one or more visual and tonal characteristics available in one or more corpuses accessible by the personalized interaction system 501, including but not limited to audio components such as voice, tone, grammar, vocabulary, speed and pronunciation of words, and visual components comprising a visual likeness and/or mannerisms of a selected persona to static or animated avatar applied to the virtual agent.

In addition to ranking and selecting a persona for the virtual agent 603, embodiments of the AI/machine learning engine 509 can further apply one or more ranking algorithms to rank potential changes in behavior or actions to apply to by the virtual agent 603 throughout the course of interaction with the user 601 in order to best maintain the attention of the user 601 and engagement therewith. When considering the ranking of potential changes in behaviors or actions to apply to the virtual agent 603, the AI/machine learning engine 509 may consider one or more inputs by the user 601 into the workflows of the user interface 525, the context within the workflow such as the criticality of a workflow step, delays in backend processing, and changes in the user's 601 mental-emotional state. Based on these features and characteristics, the AI/machine learning engine 509 may rank the potential changes in behaviors or actions provided by the virtual agent 603 addressing the user using the selected persona. For example, the AI/machine learning engine 509 may output a ranked list of changes such as increasing or decreasing small talk, offering words of encouragement, playing a game with the user, providing annotations about a topic, displaying icons or changing display themes or colors, asking questions based on user's preferences or insights, etc. For instance, if based on collected datasets, the AI/machine learning engine 509 predicts that the user enjoys talking about the weather, the virtual agent 603 may form text or sentences asking about weather at the user's location at an appropriate time, such as when a user is engaging the user interface 525 to conduct a search during the interaction.

Using the ranked list of potential changes to behaviors or actions of the virtual agent 603 that can be applied in response to user interactions, embodiments of the AI/machine learning engine 509 can further assess and predict whether certain behaviors, actions or topics of conversation have been repeated. If the highest ranked behaviors or actions have been repeated, further assessment can be made whether the highest ranked actions being repeated is being re-used beyond a threshold period of time and/or predict whether or not repeating the highest ranked behavior or action would elicit an overtly positive response from the user 601 that is above a threshold level of positive reaction. Using the example above about discussing the weather, if the virtual agent 603 has already asked a user 601 about the weather during the current interaction or the previous interaction, the AI/machine learning engine 509 can give a lower ranking to an action such as asking, "how is the weather today?". Instead, another known preference or topic of interest may be up-ranked higher than the repeat category of weather, such as sports. As a result, the AI/machine learning engine 509 may up-rank a behavior or action asking the user 601 about the user's known favorite sport, favorite team, favorite player, etc. However, in some situations where the repeated action may still illicit a very positive response from the user, the AI/machine learning engine 509 may continue to rank the behavior or action high on the ranking list. For instance, although questions about the weather were asked during the previous interaction, the topic of weather may still outrank a discussion about sports during the most recent interaction with the virtual agent 603 due to the immense positivity of the response observed and recorded by the personalized interaction system 501. Therefore, the questions about weather may be selected by AI/machine learning engine 509 before moving on to sports-related discussion with the user 601 during the current interaction session with the user 601.

In some embodiments, AI/machine learning engine 509 may further perform functions, processes or tasks to refine the behavior or actions selected from the ranking algorithm by further considering whether integration of real-time events or near real-time events correlate high enough with the selected behavior or action. For example, as part of the datasets inputted by the data analysis module 507 that comprise real-time data 523, the inclusion of real-time events may be present or searchable by the AI/machine learning engine 509. The AI/machine learning engine 509 can consider a corpus of ongoing or recently completed real-time events and rank the events in correlation with the user's profile, preferences, and insights about topics the user 601 is known to enjoy. If there is a high enough correlation between the real-time or near real-time events in the dataset inputted into the AI/machine learning engine 509, and the user's preferences, and/or insights about topics the user 601 enjoys, then the highest-ranking event correlating to the preferences and insights of the user 601 can be incorporated into the conversational workflow between the user 601 and the virtual agent 603. For example, if the selected behavior or action by the AI/machine learning engine 509 for insertion into a conversational workflow with the user is about the user's favorite sports team, and an ongoing sport's match that includes the user's favorite sports team is currently underway or recently completed, the AI/machine learning engine 509 may select to include discussion or reference to the sport's match within the conversational workflow. Moreover, as part of the integration of the sports match in the conversational workflow, the AI/machine learning engine 509 may further select to include audio or visual components associated with the real-time event, including box scores, audio or video highlights, images from the sport's match featuring the user's favorite team and/or favorite player, post-match interviews, etc., to further engage the user 601, while the user interacts with the virtual agent 603 and completes the user's intended transaction via the user interface 525.

Embodiments of the UI module 513 may be responsible for performing tasks, processes and functions associated with generating the personalized content being displayed by the user interface 525 between the user 601 and the virtual agent 603. UI module 513 may execute the implementation of the persona selected by the AI/machine learning engine 509, modifications to the behavior and actions of the virtual agent 603, including responses to conversational workflows between the virtual agent 603 and user 601. The generated content provided to the user 601 via the user interface 525, can include the audio and visual components used to modify the selected personas, behaviors and actions selected by the AI/machine learning engine 509. For example, UI module 513 may interface with the user 601 as part of the conversational workflow using the selected persona by conversing via audio components that include the persona of a real or fictitious person or character, including but not limited to dialogue provided by the virtual agent using voice signatures of the selected persona from a corpus of voice signatures; dialogue corresponding to the selected persona including speech patterns, slang, tone, grammar, speed and vocabulary thereof from a corpus of dialog options; visual mannerisms and likeness of the persona corresponding to the character or person which can be animated as a visual avatar; and any text, video, audio, and/or images corresponding to responses, behaviors and/or actions selected by the AI/machine learning engine 509, including references to real-time and near real-time events incorporated into conversational workflows between the virtual agent 603 and user 601.

Embodiments of the personalized interaction module 503 may also comprise a feedback module 517. The feedback module 517 may perform functions, processes or tasks of the personalized interaction module 503 related to collecting feedback from user 601 about interactive sessions with the virtual agent 603 that include the personalized user interface comprising personalized audio and visual components. Feedback module 517 collects the user's feedback and impressions from the interactions over the course of the interaction in real-time, and/or upon completion of the user interface 525 session. Collected feedback gauging engagement and interest of the user, as well as the goals of the virtual agent 603 to help the user complete one or more tasks and/or receive support from the virtual agent 603 are sent to the feedback module 517. The feedback module 517 can feed the user feedback from the user 601 to the data collection module 505. The user feedback contributed by the feedback module 517 can assist the AI/machine learning engine 509 to adjust or recalibrate one or more models and ranking algorithms, improving the AI/machine learning engine's 509 understanding of the user preferences, and insights about the user 601. In response to the inclusion of the user feedback into the collected datasets, the AI/machine learning engine 509 can improve the models and ranking algorithms, making predictions more precise and accurate. Improvements to the models and ranking algorithms can result in better responses that delight and maintain engagement with the user 601 and can be directly applied as part of subsequent responses within the same session between the user 601 and virtual agent 603 or may be applied in a manner that improves future sessions with the virtual agent 603.

Figure 7A:
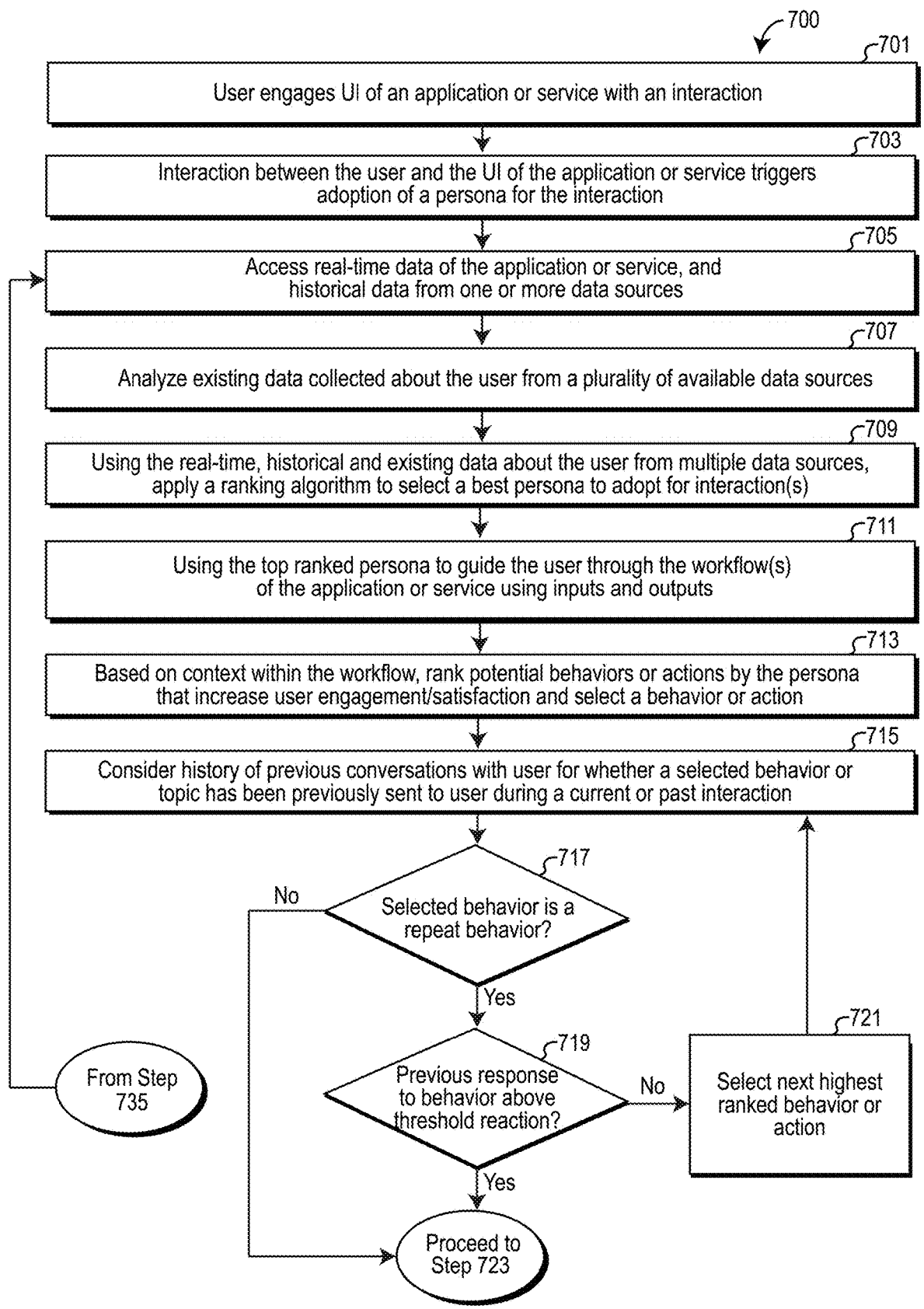
FIG. 7A depicts a flow diagram describing an embodiment of a method for personalizing user interactions with a virtual agent of a user interface, in accordance with the present disclosure.
Figure 7B:
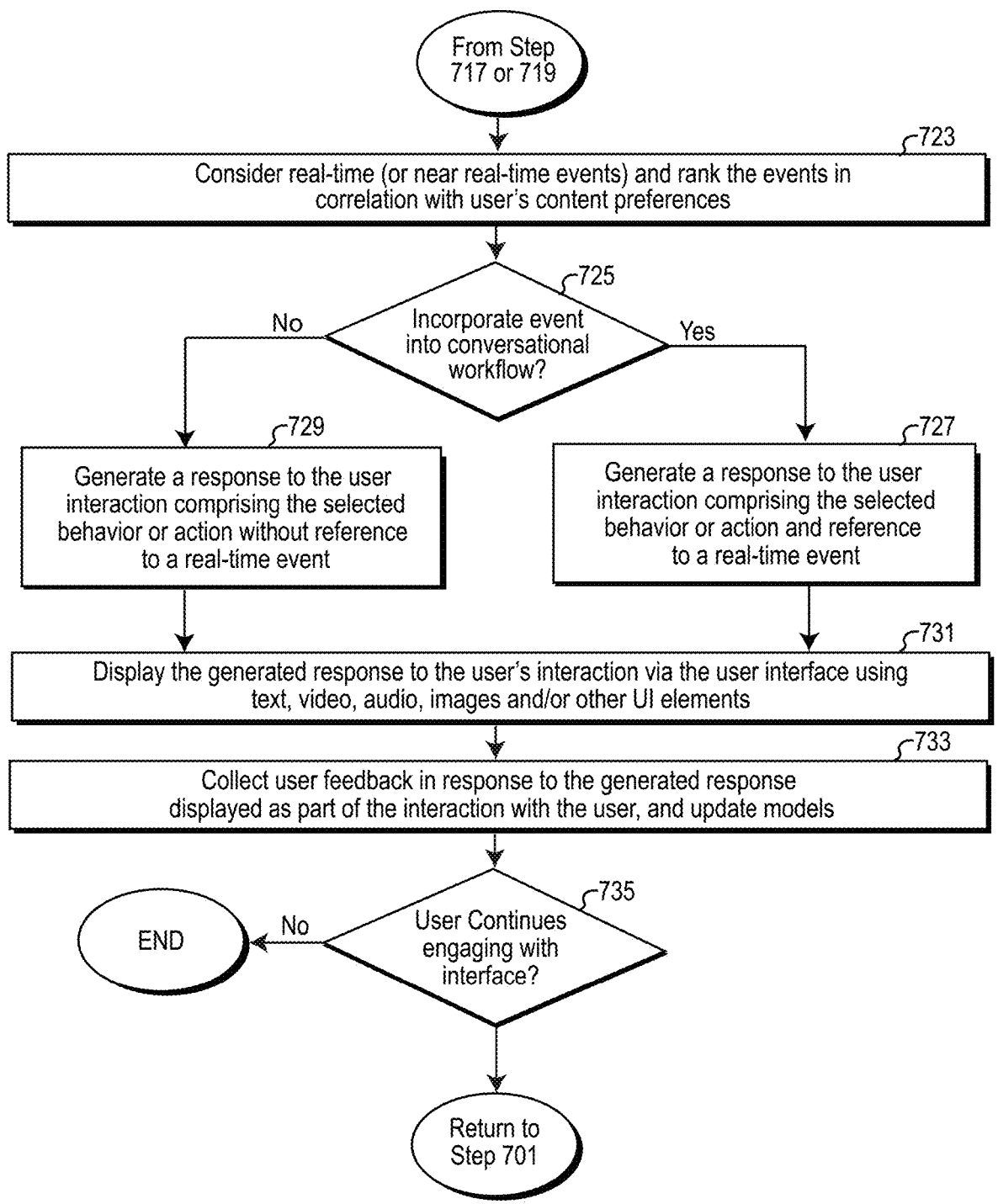
FIG. 7B depicts continuation of the flow diagram of FIG. 7A, describing the embodiment of the method for personalizing user interactions with the virtual agent of the user interface, in accordance with the present disclosure.

Method for Personalizing User Interactions with Virtual Agents of a User Interface The drawing of FIGS. 7A-7B represents an embodiment of an algorithm 700, performing a computer-implemented method for personalizing user interactions with virtual agents 603 of a user interface 525 using one or more audio and/or visual components. The algorithm 700, as shown and described by FIGS. 7A-7B, may use one or more computer systems, defined generically by computing system 100 of FIG. 1, and more specifically by the embodiments, depicted in FIGS. 2-6 and as described herein. A person skilled in the art should recognize that the steps of the algorithm 700 described in FIGS. 7A-7B may be performed in a different order than presented. The algorithm 700 may not necessarily require all the steps described herein to be performed. Rather, some embodiments of algorithm 700 may alter the methods by performing a subset of steps using one or more of the steps discussed below.

Embodiments of the algorithm 700 may begin at step 701. In step 701, a personalized interaction system 501 may detect a user 601 engaging with a virtual agent 603 operating as part of a user interface 525 running on a user device 305. The virtual agent 603 may be operating as part of an application or service being accessed by the user device 305. In step 703, in response to the user 601 engaging with the user interface 525 as part of the interaction with the virtual agent 603, the personalized interaction system 501 may trigger an adoption of a persona that can be applied to the virtual agent 603 for the duration of the interaction between the user 601 and the virtual agent 603. As part of triggering the adoption of the persona by the virtual agent 603, personalized interaction module 503 may execute data collection functions of the data collection module 505. In step 705, data collection module 505 may access and compile into the data collection module 505 user data from a plurality of available data sources, including real-time data 523 of the application or service running the user interface 525, historical data 521, internal data 519 collected about the user 601, IoT data 531 associated with the user 601 and external data from one or more external data sources 527, such as social media data accessible over one or more networks, including the internet.

In step 707, data collected from one or more data sources by the data collection module 505 can be analyzed, organized, formatted and/or pre-processed by the data analysis module 507 for input into one or more machine learning models. Once prepared and ready for modeling, data analysis module 507 may input the collected data from the plurality of data sources into AI/machine learning engine 509 for modeling. In step 709, AI/machine learning engine 509 models the real-time data 523, historical data 521, and other existing types of data collected by the data collection module 505 about the user 601. AI/machine learning engine 509 may apply one or more ranking algorithms to the collected data. The ranking algorithm(s) may be configured to select the best persona from one or more external data sources 527, which may comprise a corpus of available personas to adopt by the virtual agent 603 while interacting with the user 601. Personas ranking highest by the ranking algorithm may be considered the persona most likely to appeal to the user 601 and keep the user 601 engaged with the virtual agent during the interaction with the user interface, based on the insights of the user ascertained from the collected data and user preferences. AI/Machine learning engine 509 may select the highest ranked persona from a list of available personas readily available to personalized interactive system 501 to apply to the virtual agent 603.

In step 711, using the top ranked persona identified by the AI/Machine learning engine 509, the UI module 513 may modify the virtual agent 603 in accordance with the settings and configurations of the top ranked persona. Modification may include the application of one or more audio components or visual components. For example, audio components may include modification of virtual agent 603 with a voice signature of a popular character, actor, celebrity, sports figure, etc. Settings of the virtual agent 603 may be modified to speak to users using dialog associated with the character, actor, celebrity, etc., including speech patterns, slang, tone, grammar, speed, vocabular, use of adjectives and other defining characteristics associated with the adopted persona. Moreover, in some embodiments visual components can be applied to the virtual agent 603 as part of the persona. Application of visual components can include generation of a visual avatar that may be animated or created in real-time, in a manner that reflects the likeness of the selected character or person used as the persona for the virtual agent 603. The visual avatar can visual mannerisms and personality characteristics associated with the selected. Upon configuration of the virtual agent with the selected persona, the UI module 513 can use the virtual agent 603 as modified with the selected persona to guide the user 601 through one or more workflows presented by the application or service, as part of the user interface 525, using one or more inputs or outputs.

In step 713, based on the context of the workflows being presented and interacted with by the user 601, embodiments of the personalized interaction module 503 can modify or refine the behavior of the virtual agent 603 with a plurality of different behaviors or actions presented by the persona that are predicted to increase user 601 engagement or satisfaction with the workflows of the user interface 525, in order to encourage completion of a transaction or other activity being engaged by the user 601. For example, modifications or refinements to the virtual agent's 603 behaviors and actions within the context of the interactions and workflows with the user 601 may include behaviors or action modifications to the amount of small talk by the virtual agent 603, words of encouragement presented as part of the interactions, playing games with the user 601, etc. AI/machine learning engine 509 may rank the potential behaviors or actions available to the virtual agent 603 that can be applied by the persona in the course of engaging the user 601.

In step 715, the AI/machine learning engine 509 may further consider past conversation histories with the user 601 when selecting a top ranked behavior or action to implement in response to the user interaction. For example, the selection of the top-ranked behavior or action may be chosen with the purpose of avoiding repetitive actions or behaviors unless the user has responded in an overtly positive manner to the action or behavior in past interactions. In step 717, the AI/machine learning engine 509 may determine whether top-ranked behavior or action selected is a repeated behavior that has been presented to the user previously, or recently within a threshold period of time. If the selected behavior or action is not a repeat behavior, the algorithm 700 may proceed to step 723. However, if the selected behavior or action is a repeat behavior or action, the algorithm 700 may be further analyzed in step 719 to ensure that the response is not being repeated too often and/or the selected behavior or action expected to be overtly positive and thus continue to engage the user 601. In step 719, the repeated behavior or response selected from the rankings is further analyzed to determine whether or not the repeat behavior or response is above a threshold level of reaction or above a threshold period of time since the repeat behavior or action was presented or applied by the virtual agent 603. If the repeat behavior or action is not above a threshold level (of either time or positive reaction from the user 601), the algorithm 700 may proceed to step 721, whereby the AI/machine learning module 509 may select the next highest ranked behavior or action to implement via the virtual agent 603 in response to the user interaction. From step 721, the algorithm 700 may return to step 715 and re-consider the history of previous conversations between user 601 and virtual agent 603 to further determine whether the next highest ranked behavior or action selected in step 721 is a repeat behavior or action sent within a threshold period of time and/or is known to elicit a threshold level of positive reaction from the user.

Referring back to step 719, if upon analyzing the selected behavior or action to determine whether or not the repeat behavior is above a threshold level of a positive reaction based on previous interactions between the user 601 and the virtual agent 603 and/or a threshold period of time has passes since the repeat behavior has passed since the virtual agent has presented the repeat behavior or action to the user, then the algorithm 700 may proceed from step 719 to step 723. During step 723, the AI/machine learning engine 509 may further consider whether to integrate into the selected behavior or action a real-time or near real-time event into a conversational workflow. Embodiments of the AI/machine learning engine 509 can query real-time data 523 and/or external data source(s) 527 for ongoing real-time events and/or real-time events that may have recently concluded. The AI/machine learning engine 509 can rank the events returned by the query based on the correlation of event features to the preferences and known insights about the user 601. In step 725, based on the strength of the correlation between each events' features to the preferences or insights known about the user 601, conversational dialog can be integrated into the workflows of the interactions between the virtual agent 603 and the user 601 via the user interface 525. If a strong enough correlation is found with an event and the user 601, the AI/machine learning engine 509 can incorporate the event into the workflow and proceed to step 727, whereby the response generated by the UI module 513 comprises the selected behavior or action along with reference(s) to the real-time event. Conversely, if the correlation between the event features and the known user preferences or insights are not strong enough as determined in step 725, the algorithm 700 may proceed to step 729, whereby the UI module 513 generates a response to the user interaction comprising the selected behavior or action but is devoid of a reference to any of the real-time events returned by the query in step 723.

In step 731, the user interface 525 displays the generated response from either step 727 (with reference to real-time event(s)) or step 729 (which lacks a reference to a real-time event) in response to the user interaction. The interaction provided by the virtual agent 603 using the selected persona to present the selected behavior or action and may include text, video, audio, images, and/or other UI elements and combinations thereof to interact with the user. In step 733, as the user 601 interacts with the persona of the virtual agent 603 using the selected behaviors and actions presented by the virtual agent 603, the user feedback module 517 can collect feedback about the user 601 in response to the virtual agent 603. For example, whether the user responds positively or negatively, body language of the user, sentiment, engagement and/or whether the user continues to respond or ends the interactive session with the user interface 525. The collected user feedback can be sent to the data collection module 505 and may be used to update one or more machine learning models and/or influence decisions by the AI/machine learning engine 509 as interactions with the user 601 continue or as new interactions arise in the future with the same user 601. In step 735, the algorithm 700 further determines whether or not the user continues to engage with the user interface 525 or has the user ended the session with the virtual agent 603. If the user ends the session with the virtual agent 603, times out the session and/or fails to continue engagement with the virtual agent for a threshold period of time, algorithm 700 may end. Conversely, when the user continues to engage the user interface 525 and continues the session with the virtual agent 603, the method may return to step 701, whereby the user 601 engages with the virtual agent and the user interface 525 and the personalized interaction system 501 can customize the response to the user's continued interactions.

What is claimed is:

1. A computer-implemented method, the computer-implemented method comprising:
   receiving, by a processor, an engagement with a virtual agent of a user interface by a user;
   triggering, by the processor, in response to the engagement of the virtual agent, a selection of a persona for the virtual agent, wherein selection of the persona comprises:
   collecting, by the processor, real-time data of an application or service running the user interface and historical data about the user from one or more data sources and a corpus of available personas, wherein each of the available personas comprises audio components or visual components that modify a visual appearance or audio presentation of the virtual agent on the user interface;
   applying, by the processor, a ranking algorithm to the available personas, wherein the ranking algorithm ranks the available personas based on features that most closely align with preferences of the user; and
   selecting, by the processor, a highest ranked persona from the ranked available personas;
   modifying, by the processor, settings and behaviors of the virtual agent with one of more of the audio components or visual components in accordance with the selected persona;
   guiding, by the processor, the user through a workflow presented by the user interface via the modified virtual agent;
   generating, by the processor, a response to an input from the user during the workflow, the response comprising a behavior or action to be executed by the modified virtual agent, wherein the selecting the behavior or action comprises:
   ranking, by the processor, behaviors or actions implemented by the selected persona that are predicted, based on previous conversations with the user, to increase engagement or satisfaction of the user during the guided workflow;
   determining, by the processor, that a highest ranked behavior or action from the ranked behaviors or actions is a repeat behavior or action; and
   in response to determining, based on the previous conversations, that a previous response of the user to the repeat behavior or action was below a threshold level of positive reaction, selecting a next highest ranked behavior or action to execute by the modified virtual agent; and
   outputting, by the processor, the response to the user via the user interface using the persona of the virtual agent to implement the selected behavior or action.

2. The computer-implemented method of claim 1, wherein modifying settings and behaviors of the virtual agent with audio components includes applying a voice signature to the virtual agent that mimics speech or dialog patterns of a real or fictious character or person.

3. The computer-implemented method of claim 2, wherein the speech or dialog patterns applied to the virtual agent modify speech output of the virtual agent selected from the group consisting of slang, tone, grammar, speed, vocabulary, use of adjectives and combinations thereof.

4. The computer-implemented method of claim 1, wherein the ranking algorithm weights previously used personas that have previously been used to interact with the user via the user interface lower in the ranking than unused personas.

5. The computer-implemented method of claim 2, wherein modifying the settings and the behaviors of the virtual agent with visual components comprises:
   animating, by the processor, a visual avatar for the virtual agent, displayed by the user interface, wherein the visual avatar corresponds to the real or the fictitious character or person associated with the voice signature applied to the virtual agent.

6. The computer-implemented method of claim 1, further comprising:
querying, by the processor, a corpus of real-time or near real-time events occurring during a present time period;
ranking, by the processor, the real-time or near real-time events in correlation to preferences of the user;
determining, by the processor, that a highest-ranked real-time or near real-time event meets or exceeds a threshold level of correlation to the preferences of the user; and
in response to the determining, incorporating, by the processor, information describing the highest-ranked real-time or near real-time event into the behavior or action outputted by the virtual agent via the user interface.

7. A computer system comprising:
a processor; and
a computer-readable storage media coupled to the processor, wherein the computer-readable storage media contains program instructions executing, via the processor, a computer-implemented method comprising:
receiving, by the processor, an engagement with a virtual agent of a user interface by a user;
triggering, by the processor, in response to the engagement of the virtual agent, a selection of a persona for the virtual agent, wherein selection of the persona comprises:
collecting, by the processor, real-time data of an application or service running the user interface and historical data about the user from one or more data sources and a corpus of available personas, wherein each of the available personas comprises audio components or visual components that modify a visual appearance or audio presentation of the virtual agent on the user interface;
applying, by the processor, a ranking algorithm to the available personas, wherein the ranking algorithm ranks the available personas based on features that most closely align with preferences of the user; and
selecting, by the processor, the persona from the ranking of available personas that is ranked highest by the ranking algorithm for the user;
modifying, by the processor, settings and behaviors of the virtual agent with one of more of the audio components or visual components in accordance with the selected persona;
guiding, by the processor, the user through a workflow presented by the user interface via the modified virtual agent;
generating, by the processor, a response to an input from the user during the workflow, the response comprising a behavior or action to be executed by the modified virtual agent, wherein the selecting the behavior or action comprises:
ranking, by the processor, behaviors or actions implemented by the selected persona that are predicted, based on previous conversations with the user, to increase engagement or satisfaction of the user during the guided workflow;
determining, by the processor, that a highest ranked behavior or action from the ranked behaviors or actions is a repeat behavior or action; and
in response to determining, based on the previous conversations, that a previous response of the user to the repeat behavior or action was below a threshold level of positive reaction, selecting a next highest ranked behavior or action to execute by the modified virtual agent; and
outputting, by the processor, the response to the user via the user interface using the modified virtual agent to implement the selected behavior or action.

8. The computer system of claim 7, wherein modifying settings and behaviors of the virtual agent with audio components includes applying a voice signature to the virtual agent that mimics speech or dialog patterns of a real or fictious character or person.

9. The computer system of claim 8, wherein the speech or dialog patterns applied to the virtual agent modify speech output of the virtual agent selected from the group consisting of slang, tone, grammar, speed, vocabulary, use of adjectives and combinations thereof.

10. The computer system of claim 7, wherein the ranking algorithm weights previously used personas that have previously been used to interact with the user via the user interface lower in the ranking than unused personas.

11. The computer system of claim 8, wherein modifying the settings and the behaviors of the virtual agent with visual components comprises:
animating, by the processor, a visual avatar for the virtual agent, displayed by the user interface, wherein the visual avatar corresponds to the real or the fictitious character or person associated with the voice signature applied to the virtual agent.

12. The computer system of claim 8, further comprising:
querying, by the processor, a corpus of real-time or near real-time events occurring during a present time period;
ranking, by the processor, the real-time or near real-time events in correlation to preferences of the user;
determining, by the processor, that a highest-ranked real-time or near real-time event meets or exceeds a threshold level of correlation to the preferences of the user; and
in response to the determining, incorporating, by the processor, information describing the highest-ranked real-time or near real-time event into the behavior or action outputted by the virtual agent via the user interface.

13. A computer program product comprising:
one or more computer readable storage media having computer-readable program instructions stored on the one or more computer readable storage media, said program instructions executes a computer-implemented method comprising:
receiving, by a processor, an engagement with a virtual agent of a user interface by a user;
triggering, by the processor, in response to the engagement of the virtual agent, a selection of a persona for the virtual agent, wherein selection of the persona comprises:
collecting, by the processor, real-time data of an application or service running the user interface and historical data about the user from one or more data sources and a corpus of available personas, wherein each of the available personas comprises audio components or visual components that modify a visual appearance or audio presentation of the virtual agent on the user interface;
applying, by the processor, a ranking algorithm to the available personas, wherein the ranking algorithm ranks the available personas based on features that most closely align with preferences of the user; and selecting, by the processor, a highest ranked persona from the ranked available personas;

modifying, by the processor, settings and behaviors of the virtual agent with one of more of the audio components or visual components in accordance with the selected persona;

guiding, by the processor, the user through a workflow presented by the user interface via the modified virtual agent;

generating, by the processor, a response to an input from the user during the workflow, the response comprising a behavior or action to be executed by the modified virtual agent, wherein the selecting the behavior or action comprises:

ranking, by the processor, behaviors or actions implemented by the selected persona that are predicted, based on previous conversations with the user, to increase engagement or satisfaction of the user during the guided workflow;

determining, by the processor, that a highest ranked behavior or action from the ranked behaviors or actions is a repeat behavior or action; and in response to determining, based on the previous conversations, that a previous response of the user to the repeat behavior or action was below a threshold level of positive reaction, selecting a next highest ranked behavior or action to execute by the modified virtual agent; and outputting, by the processor, the response to the user via the user interface using the modified virtual agent to implement the selected behavior or action.

14. The computer program product of claim 13, wherein modifying settings and behaviors of the virtual agent with audio components includes applying a voice signature to the virtual agent that mimics speech or dialog patterns of a real or fictious character or person.

15. The computer program product of claim 14, wherein the speech or dialog patterns applied to the virtual agent modify speech output of the virtual agent selected from the group consisting of slang, tone, grammar, speed, vocabulary, use of adjectives and combinations thereof.

16. The computer program product of claim 14, wherein modifying the settings and the behaviors of the virtual agent with visual components comprises:

animating, by the processor, a visual avatar for the virtual agent, displayed by the user interface, wherein the visual avatar corresponds to the real or the fictitious character or person associated with the voice signature applied to the virtual agent.

17. The computer program product of claim 13 further comprising:

querying, by the processor, a corpus of real-time or near real-time events occurring during a present time period;

ranking, by the processor, the real-time or near real-time events in correlation to preferences of the user;

determining, by the processor, that a highest-ranked real-time or near real-time event meets or exceeds a threshold level of correlation to the preferences of the user; and in response to the determining, incorporating, by the processor, information describing the highest-ranked real-time or near real-time event into the behavior or action outputted by the virtual agent via the user interface.

* * * * *